United States Patent
Gandhi et al.

(10) Patent No.: US 11,548,261 B2
(45) Date of Patent: Jan. 10, 2023

(54) STRUCTURE WITH SELECTIVELY VARIABLE STIFFNESS

(71) Applicant: Toyota Motor Engineering & Manufacturing North America, Inc., Plano, TX (US)

(72) Inventors: Umesh N. Gandhi, Farmington Hills, MI (US); Danil V. Prokhorov, Canton, MI (US); Michael Paul Rowe, Pinckney, MI (US); Ryohei Tsuruta, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/169,333

(22) Filed: Oct. 24, 2018

(65) Prior Publication Data

US 2020/0130321 A1    Apr. 30, 2020

(51) Int. Cl.
*B32B 3/30* (2006.01)
*B32B 3/08* (2006.01)
(Continued)

(52) U.S. Cl.
CPC .................. *B32B 3/30* (2013.01); *B32B 3/08* (2013.01); *B32B 7/02* (2013.01); *B32B 7/03* (2019.01);
(Continued)

(58) Field of Classification Search
CPC .... B32B 3/30; B32B 7/03; B32B 3/08; B32B 7/02; B32B 33/00; B32B 2250/05;
(Continued)

(56) References Cited

U.S. PATENT DOCUMENTS

| 2,241,086 A | 1/1939 | Gould |
| 4,286,910 A | 9/1981 | Conrad |

(Continued)

FOREIGN PATENT DOCUMENTS

| JP | H07303381 A | 11/1995 |
| JP | 2007097292 A | 4/2007 |

(Continued)

OTHER PUBLICATIONS

Yang et al, "Novel Design and 3D Printing of Variable Stiffness Robotic Grippers," Dec. 2016, ASME, vol. 8, pp. 061010-1 to 061010-15 (Year: 2016).*

(Continued)

*Primary Examiner* — Travis M Figg
*Assistant Examiner* — Ethan Weydemeyer
(74) *Attorney, Agent, or Firm* — Christopher G. Darrow; Darrow Mustafa PC (57) ABSTRACT

A stiffness control and systems for the same are disclosed herein. A first plate and a second plate can be connected with rigid support, a hydraulic actuator and a high roughness surface. Upon actuation, the actuator can force the high roughness surface against the first plate, thus increasing rigidity through hydraulic pressure against the first plate and the second plate. Thus, the stiffness of the surface can be altered in a variable and reversible fashion.

20 Claims, 6 Drawing Sheets

(51) Int. Cl.
*B32B 7/02* (2019.01)
*B32B 7/00* (2019.01)
*B32B 33/00* (2006.01)
*B32B 7/03* (2019.01)
*F16F 7/12* (2006.01)

(52) U.S. Cl.
CPC .......... *B32B 33/00* (2013.01); *B32B 2250/05* (2013.01); *B32B 2250/40* (2013.01); *B32B 2307/51* (2013.01); *B32B 2307/536* (2013.01); *B32B 2307/56* (2013.01); *F16F 7/128* (2013.01)

(58) Field of Classification Search
CPC ............ B32B 2250/40; B32B 2307/51; B32B 2307/536; B32B 2307/56; F16F 7/128; B60N 2/914; B60N 2/99; B60N 2002/026; B60N 2/0244; B60N 2/1665; B60N 2/665; F15B 15/103; F15B 15/10; F15B 15/088; B60J 10/244; F16K 99/0015; F16K 99/0051; F16K 31/02; F16K 31/0675; F16K 31/06; F16K 31/0679; F16K 99/0026; B25J 9/142; B25J 9/065; B25J 18/06; B60R 1/0625; Y10T 137/2213

See application file for complete search history.

(56) References Cited

U.S. PATENT DOCUMENTS

| | | |
|---|---|---|
| 4,319,427 A | 3/1982 | Way, Jr. |
| 4,726,656 A | 2/1988 | Schofield et al. |
| 4,848,179 A | 7/1989 | Ubhayakar |
| 4,923,057 A | 5/1990 | Carlson et al. |
| 4,958,100 A | 9/1990 | Crawley et al. |
| 4,964,062 A | 10/1990 | Ubhayakar et al. |
| 5,021,798 A | 6/1991 | Ubhayakar |
| 5,065,978 A | 11/1991 | Albarda et al. |
| 5,222,668 A | 6/1993 | Frankeny et al. |
| 5,502,345 A | 3/1996 | Kahn et al. |
| 5,536,062 A | 7/1996 | Spears |
| 5,668,432 A | 9/1997 | Tominaga et al. |
| 6,029,783 A | 2/2000 | Wirthlin |
| 6,065,978 A | 5/2000 | Dehan et al. |
| 6,120,002 A | 9/2000 | Biegelsen et al. |
| 6,203,717 B1 | 3/2001 | Munoz et al. |
| 6,215,221 B1 | 4/2001 | Cabuz et al. |
| 6,490,960 B1 | 12/2002 | Jackson et al. |
| 6,685,442 B2 | 2/2004 | Chinn et al. |
| 6,702,301 B1 | 3/2004 | Davies et al. |
| 6,830,071 B2 | 12/2004 | Xu et al. |
| 6,882,086 B2 | 4/2005 | Kornbluh et al. |
| 6,939,291 B2 | 9/2005 | Phee Soo Jay |
| 7,353,747 B2 | 4/2008 | Swayze et al. |
| 7,484,735 B2 | 2/2009 | Verbugge et al. |
| 7,575,807 B1 | 8/2009 | Barvosa-Carter et al. |
| 7,594,697 B2 | 9/2009 | Browne et al. |
| 7,673,562 B2 | 3/2010 | Pattekar et al. |
| 7,755,840 B2 | 7/2010 | Batchko et al. |
| 7,892,630 B1 | 2/2011 | McKnight et al. |
| 7,901,524 B1 | 3/2011 | McKnight et al. |
| 7,905,538 B2 | 3/2011 | Ukpai et al. |
| 7,909,403 B2 | 3/2011 | Lawall et al. |
| 8,136,875 B2 | 3/2012 | Laake |
| 8,222,799 B2 | 7/2012 | Polyakov et al. |
| 8,231,563 B2 | 7/2012 | Mauge et al. |
| 8,240,677 B2 | 8/2012 | Browne et al. |
| 8,272,392 B2 | 9/2012 | Pattekar et al. |
| 8,430,810 B2 | 4/2013 | Hassidov et al. |
| 8,863,608 B2 | 10/2014 | Fischer et al. |
| 9,005,420 B2 | 4/2015 | Tomantschger et al. |
| 9,061,118 B2 | 6/2015 | Shoham et al. |
| 9,308,949 B1 | 4/2016 | Mihelic et al. |
| 9,580,115 B2 | 2/2017 | Haller |
| 9,764,113 B2 | 9/2017 | Tuval et al. |
| 9,790,968 B2 | 10/2017 | Yang et al. |
| 9,919,418 B2 | 3/2018 | Hashimoto |
| 9,937,966 B1 | 4/2018 | Yoon et al. |
| 9,970,564 B2 | 5/2018 | Dankbaar et al. |
| 10,058,647 B2 | 8/2018 | Roche et al. |
| 10,293,718 B1 | 5/2019 | Ilievski et al. |
| 10,302,586 B2 | 5/2019 | Sun et al. |
| 10,465,723 B2 | 11/2019 | Ilievski et al. |
| 10,631,083 B1 | 4/2020 | Gandhi et al. |
| 10,640,033 B1 | 5/2020 | Gandhi et al. |
| 10,682,903 B1 | 6/2020 | Gandhi et al. |
| 10,682,931 B2 | 6/2020 | Rowe et al. |
| 10,746,206 B1 | 8/2020 | Rowe et al. |
| 10,749,448 B2 | 8/2020 | Lindsay et al. |
| 10,797,217 B2 | 10/2020 | Hakkens et al. |
| 10,946,535 B2 | 3/2021 | Gandhi et al. |
| 2002/0100888 A1 | 8/2002 | Sharma et al. |
| 2004/0077292 A1 | 4/2004 | Kim et al. |
| 2004/0107829 A1* | 6/2004 | Davis .................... F15B 15/103 92/90 |
| 2004/0261411 A1* | 12/2004 | MacGregor .............. G12B 1/00 60/527 |
| 2005/0045480 A1 | 3/2005 | Krumme |
| 2005/0198904 A1 | 9/2005 | Browne et al. |
| 2005/0206096 A1 | 9/2005 | Browne et al. |
| 2006/0032715 A1 | 2/2006 | Barvosa-Carter et al. |
| 2006/0038745 A1 | 2/2006 | Naksen et al. |
| 2007/0046074 A1 | 3/2007 | Satta et al. |
| 2007/0120438 A1 | 5/2007 | Divoux |
| 2007/0246898 A1 | 10/2007 | Keefe et al. |
| 2009/0052049 A1* | 2/2009 | Batchko ................ B33Y 50/02 359/666 |
| 2009/0086331 A1 | 4/2009 | Gunasekaran et al. |
| 2009/0115285 A1 | 5/2009 | Najaf et al. |
| 2009/0255187 A1 | 10/2009 | Alexander et al. |
| 2010/0090497 A1 | 4/2010 | Beckon |
| 2010/0258362 A1 | 10/2010 | Trimmer |
| 2011/0188258 A1 | 8/2011 | Tajima |
| 2012/0287493 A1 | 11/2012 | Kuhlman et al. |
| 2013/0255815 A1 | 10/2013 | Brinkmann et al. |
| 2013/0304049 A1 | 11/2013 | Behnke, II et al. |
| 2013/0318962 A1 | 12/2013 | Joshi et al. |
| 2014/0109560 A1 | 4/2014 | Ilievski et al. |
| 2015/0197173 A1 | 7/2015 | Hulway |
| 2015/0331156 A1 | 11/2015 | Hirsa |
| 2016/0106620 A1 | 4/2016 | Uno et al. |
| 2017/0036709 A1 | 2/2017 | Metka et al. |
| 2017/0080987 A1 | 3/2017 | Morgan |
| 2017/0150252 A1 | 5/2017 | Trestain et al. |
| 2017/0240224 A1 | 8/2017 | Gaylard et al. |
| 2018/0036198 A1 | 2/2018 | Mergl et al. |
| 2018/0172172 A1 | 6/2018 | Oehler et al. |
| 2018/0339624 A1 | 11/2018 | Leek |
| 2019/0023161 A1 | 1/2019 | Sullivan et al. |
| 2019/0032684 A1 | 1/2019 | Kowalewski et al. |
| 2019/0059608 A1 | 2/2019 | Yan et al. |
| 2019/0232822 A1 | 8/2019 | Hintermaier |
| 2019/0296217 A1 | 9/2019 | Jung et al. |
| 2019/0312193 A1 | 10/2019 | Pelssers et al. |
| 2019/0322324 A1 | 10/2019 | Hurst |
| 2019/0326505 A1 | 10/2019 | Pelssers et al. |
| 2020/0032822 A1 | 1/2020 | Keplinger et al. |
| 2020/0066963 A1 | 2/2020 | Johnson et al. |
| 2020/0130202 A1 | 4/2020 | Gandhi et al. |
| 2020/0132213 A1 | 4/2020 | Gandhi et al. |
| 2020/0132223 A1 | 4/2020 | Prokhorov et al. |
| 2020/0136525 A1 | 4/2020 | Gandhi et al. |
| 2020/0136526 A1 | 4/2020 | Gandhi et al. |
| 2020/0156237 A1 | 5/2020 | Tang et al. |
| 2020/0156314 A1 | 5/2020 | Rowe et al. |
| 2020/0182269 A1 | 6/2020 | Rowe |
| 2020/0189469 A1 | 6/2020 | Gandhi et al. |
| 2020/0216121 A1 | 7/2020 | Gandhi et al. |

(56) References Cited

U.S. PATENT DOCUMENTS

2020/0238854 A1 7/2020 Gandhi et al.
2020/0259426 A1 8/2020 Rowe

FOREIGN PATENT DOCUMENTS

| KR | 20050056526 A | 6/2005 | |
|---|---|---|---|
| WO | WO-2009048952 A1 * | 4/2009 | ............... F15B 7/00 |
| WO | 2017077541 A1 | 5/2017 | |
| WO | 2018175741 A1 | 9/2018 | |

OTHER PUBLICATIONS

SMC Tech, "Precision Regulator: Series IR1000/2000/3000," 2015, SMC Tech, pp. 713-725 and 1-19 (Year: 2015).*
Knoss, "Next-gen flexible robots move and heal like us," CU Boulder Today, Jan. 4, 2018, retrieved from the Internet: <https://www.colorado.edu/today/2018/01/04/next-gen-flexible-robots-move-and-heal-us>, [retrieved Mar. 30, 2018] (6 pages).
Acome et al., "Hydraulically Amplified Self-Healing Electrostatic Actuators with Muscle-Like Performance," Science, vol. 359, Issue 6371, pp. 61-65 (Jan. 5, 2018) (6 pages).
International Search Report and Written Opinion for International Application No. PCT/US2019/056225, dated Feb. 3, 2020 (11 pages).
Acome et al., "Hydraulically Amplified Self-Healing Electrostatic Actuators with Muscle-Like Performance," Science, vol. 359, Issue 6371, 61-65 (2018).

* cited by examiner

STRUCTURE WITH SELECTIVELY VARIABLE STIFFNESS

TECHNICAL FIELD

The subject matter described herein generally relates to rigid structures and, more particularly, a rigid structure with variable stiffness characteristics.

BACKGROUND

Various load receiving devices, such as tables, structural supports, flat-bed trucks, forklifts, warehouse storage shelving and the like, are necessary for transporting and storing goods and materials to various locations. For example, large scale heavy shipments are transported daily using large big rig trucks and are stored in warehouses capable of holding various types of materials. These transportation and storage devices used for holding and supporting other objects. As well, some these transportation and storage devices allow large scale goods and materials to be moves or stored without compromising safety or attentiveness. These devices are generally built to receive weight under and up to a maximum weight before failure, withstanding a specific amount of force and failing above that level of force.

SUMMARY

Disclosed herein is a structure, capable of having controllable stiffness, utilizing one or more actuators. In one embodiment, a structure with variable stiffness is disclosed. The structure with variable stiffness can include a first plate having a variable stiffness region, the first plate attached to a rigid support. The structure with variable stiffness can further include a second plate having a variable stiffness region, the second plate positioned opposite the first plate and attached to the rigid support. The structure with variable stiffness can further include a jamming material attached to an inner surface of the first plate. The structure with variable stiffness can further include an actuator connected with an inner surface of the second plate and the jamming material, the soft hydraulic actuator configured to create a hydraulic force against the jamming material and the second plate.

In another embodiment, a structure with variable stiffness is disclosed. The structure with variable stiffness can further include a first plate having a variable stiffness region, the first plate attached to a rigid support. The structure with variable stiffness can further include a second plate having a variable stiffness region, the second plate positioned opposite the first plate and attached to the rigid support. The structure with variable stiffness can further include a locking hydraulic actuator connected with an inner surface of the second plate, the locking hydraulic actuator configured to create a hydraulic force against the first plate and the second plate, and to resist deformation in response to receiving an electrical input.

In another embodiment, a stiffness control system is disclosed. The stiffness control system can include a structure having one or more actuators and configured to harden in response to an electrical current. The stiffness control system can further include a stiffness control system for controlling a structure. The stiffness control system can include one or more processors. The stiffness control system can further include a memory communicably coupled to the one or more processors. The memory can store a flexibility control module including instructions that when executed by the one or more processors cause the one or more processors to receive input regarding a response parameter for the structure, and to send an activation signal with relation to the response parameter. The memory can further store a response module including instructions that when executed by the one or more processors cause the one or more processors to deliver an electrical current to the one or more actuators in response to the activation signal.

BRIEF DESCRIPTION OF THE DRAWINGS

So that the manner in which the above recited features of the present disclosure can be understood in detail, a more particular description of the disclosure, briefly summarized above, may be had by reference to the embodiments, some of which are illustrated in the appended drawings. It is to be noted, however, that the appended drawings illustrate only typical embodiments of this disclosure and are therefore not to be considered limiting of its scope. The disclosure may admit to other equally effective embodiments.

To facilitate understanding, identical reference numerals have been used, wherever possible, to designate identical elements that are common to the figures. Additionally, elements of one embodiment may be advantageously adapted for utilization in other embodiments described herein.

DETAILED DESCRIPTION

Disclosed herein are structure with variable stiffness characteristics and methods of making and using the same. Rigid structures generally have a uniform stiffness and are thus not capable of varying their ability to manage a load. This uniform stiffness can leave a surface incapable of responding to changing demands, offering high support in times of low load and collapsing under higher loads. The structure with variable stiffness characteristics described herein addresses this issue through the use of a hydraulic force. "Stiffness" as used herein generally relates to mechanical properties of the structure or portions thereof, including malleability, flexibility, deformability, rigidity, brittleness, and/or other mechanical characteristics of the structure. The structure with variable stiffness characteristics can employ one or more actuators. The actuators can act against a series of plates, which can distribute a force.

The actuators can operate based on both expansion of a membrane and exerting pressure against a jamming material. In one example, the jamming material can be a rough or grit material or other material with a high surface area roughness. Surface area roughness relates to variance in surface flatness from a mean line. In one example, high surface roughness can refer to a surface which has a Ra value of greater than 0.3 microns, such as a surface having an Ra value of at least 0.38 microns. The jamming material can be configured to increase actuator rigidity and/or provide for actuator locking. The structure with variable stiffness characteristics can have a variety of patterns. In one embodiment, the rigid plates can be flexible or semi-flexible, such that the flexibility can be maintained once a final actuator force is achieved. The embodiments disclosed herein are more described in further detail with reference to the figures below.

Figure 1A:
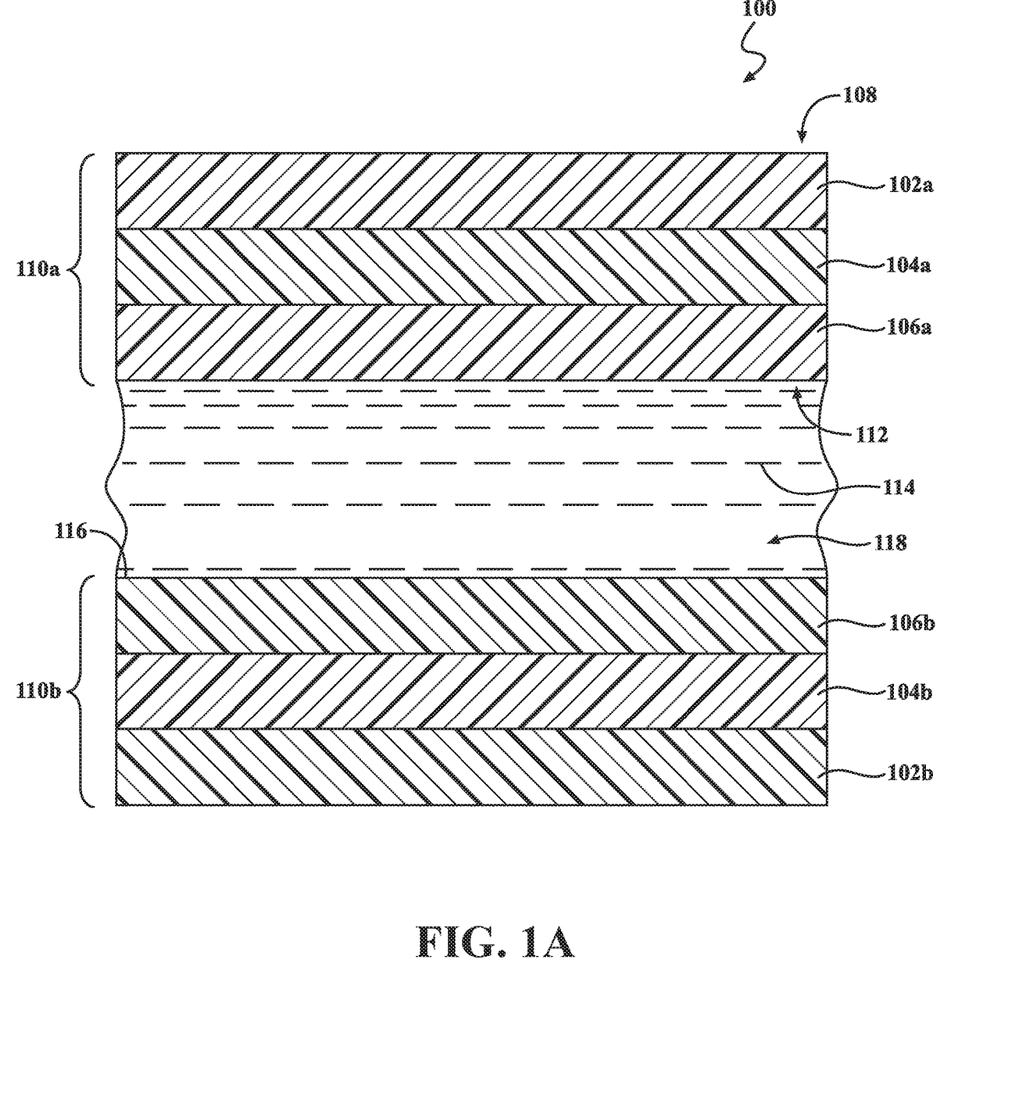
FIGS. 1A and 1B are sectional views of an actuator, according to one or more embodiments.
Figure 1B:
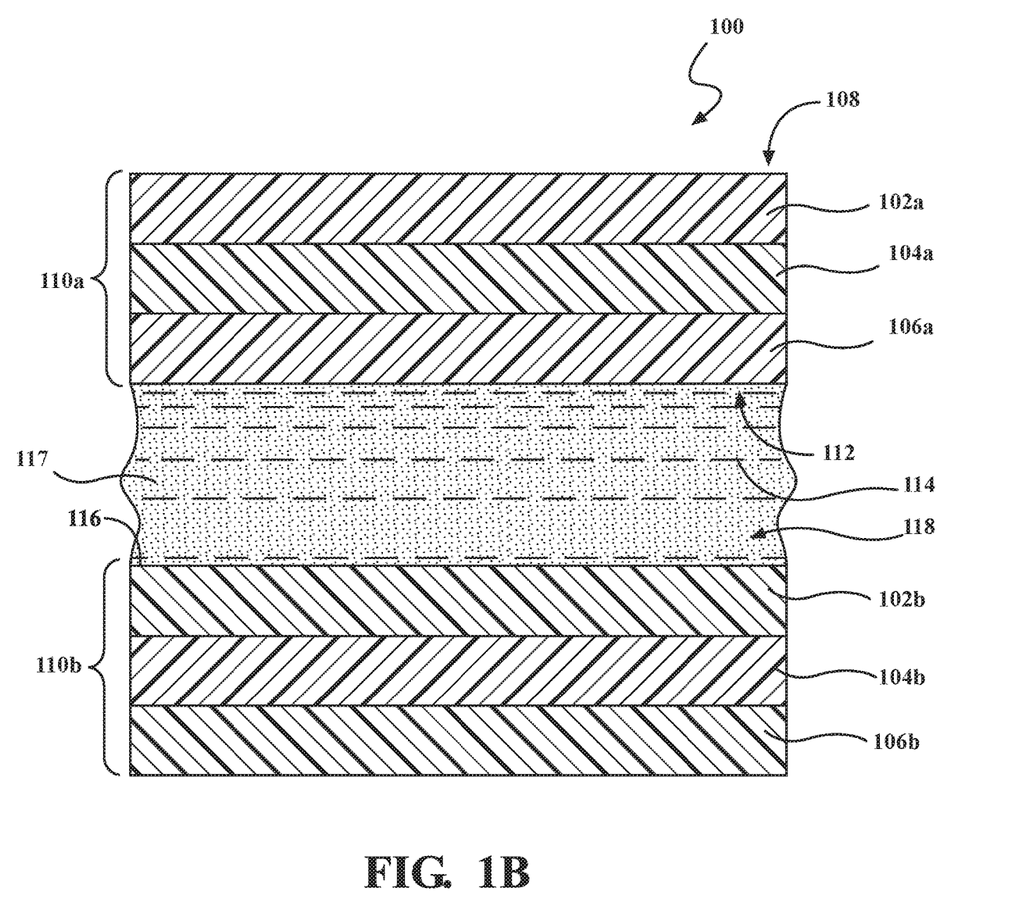

FIGS. 1A and 1B are sectional views of an actuator 100, according to one or more embodiments. The actuator 100 can be a hydraulic actuator. As will be described herein, the actuator 100 can be configured for connection with a surface and for moving one or more objects. The actuator 100 can have a pliable or semi-pliable body, or can otherwise have a soft body. The actuator 100 can be an electrostatic device capable of displacing and/or affecting the flow of a fluid with the application of electric charge.

The application of an electric charge can be used to attract two or more conductive elements together into an actuated position. "Actuated position," as used herein, relates to a position of the actuator in response to receiving an input. In one or more embodiments, the actuated position can be achieved by delivering an electrical input to conductive portions of a fluid-impermeable membrane, as described herein. As a result, opposing inner surfaces of the membrane can be brought toward each other via electrostatic attraction. Thus, hydraulic force can be created. "Relaxed position," as used herein, refers to a position of the actuator in the absence of an input. In the relaxed position, the actuator 100 is in a state without an input that causes electrostatic attraction to create a hydraulic force in the membrane.

In one embodiment, the relaxed position includes the original shape or the substantially original shape of the membrane, in response to stopping the electrical input to the conductive portions. The actuator 100 can be capable of changing shape in the presence of the electric charge, causing fluid pressure to be applied to the portions of the fluid-impermeable membranes 110a and 110b. This fluid pressure can then change the shape of the actuator 100, in relation to the elasticity of the fluid-impermeable membranes 110a and 110b. Thus, the actuator 100 has a first shape which is maintained in the absence of an electrical input. The electric charge to the actuator 100 can then be delivered, causing the actuator 100 to achieve to a second state, which can include one or more activated shapes, due to hydraulic forces. When the charge is removed, the actuator 100 can then return to substantially the first shape.

Components of the actuator 100 are depicted here, according to one or more embodiments. As shown here, the actuator 100 includes fluid-impermeable membranes 110a and 110b and a dielectric fluid 114. The fluid-impermeable membranes 110a and 110b can be composed of layers, such as an external insulating portions 102a and 102b, a conducting portions 104a and 104b, and internal insulating portions 106a and 106b. "Portion," as used herein, relates to one or more components which form a layer, a portion of a layer, or structure in the fluid-impermeable membranes 110a and 110b of the actuator 100. The portions can have non-uniform coverage or thickness, as desired. The portions above are described as a single, uniform element or layer for simplicity purposes. However, the portions can include one or more of any of the layers, portions of layers, or variations as disclosed herein. As such, the portions may only partially extend the dimensions of the fluid-impermeable membranes 110a and 110b. As well, the portions of the fluid-impermeable membranes 110a and 110b can meet to form a seal, such that a chamber or compartment 118 is formed in the inner region of the fluid-impermeable membranes 110a and 110b.

It should be noted that internal insulating portions 106a and 106b can be the same structure, or they can be separate structures. Further, external insulating portions 102a and 102b can be separate portions, or they can be the same structure.

The fluid-impermeable membranes 110a and 110b, or components thereof (e.g., the external insulating portions 102a and 102b, the conducting portions 104a and 104b, and/or the internal insulating portions 106a and 106b), can be flexible and/or elastic at one or more points and/or across one or more portions of the fluid-impermeable membranes 110a and 110b. In one embodiment, the fluid-impermeable membranes 110a and 110b, or components thereof, are completely flexible and elastic. In another embodiment, the fluid-impermeable membranes 110a and 110b are flexible across the entirety, but only elastic across one or more strips of the fluid-impermeable membranes 110a and 110b. In another embodiment, the fluid-impermeable membranes 110a and 110b are flexible and elastic at the external insulating portion 102a and 102b and the internal insulating portions 106a and 106b, but neither flexible nor elastic at the conducting portions 104a and 104b. One skilled in the art will understand the variety of combinations of flexibility, elasticity, and positioning of the portions of the fluid-impermeable membranes 110a and 110b, without further explicit recitation of specific examples herein.

The external insulating portion 102a and 102b can form an exterior surface 108 of the fluid-impermeable membranes 110a and 110b. In one embodiment, the external insulating portion 102a and 102b can form the entire exterior surface of the fluid-impermeable membranes 110a and 110b. The external insulating portion 102a and 102b can be flexible and/or elastic at one or more portions. In one embodiment, the external insulating portion 102a and 102b are entirely flexible and elastic. In another embodiment, the external insulating portion 102a and 102b can have interspersed regions of flexibility, or flexibility and elasticity. The interspersed regions can be in a pattern or random, as desired. The external insulating portion 102a and 102b can form an interface with the surface of one or more inner layers, such as the internal insulating portions 106a and 106b and/or the conducting portions 104a and 104b.

The external insulating portion 102a and 102b can include a polymer, an elastomeric polymer (elastomer) or both. The use of a plurality of different encapsulating elastomers and/or polymers of varying degrees of softness and hardness can be employed. The polymers used in the embodiments described herein can further include the addition of a plasticizer, such as phthalate esters. The polymers or elastomers may be natural or synthetic. Examples of elastomers usable as part of the external insulating portion 102a and 102b can include an insulating elastomer, such as nitrile, ethylene propylene diene monomer (EPDM), fluorosilicone (FVMQ), vinylidene fluoride (VDF), hexafluoropropylene (HFP), tetrafluoroethylene (TFE), perfluoromethylvinylether (PMVE), polydimethylsiloxane (PDMS), natural rubber, neoprene, polyurethane, silicone, silicone rubber, or combinations thereof. The external insulating portion 102a and 102b can be described with regards to electrical insulation. The electrical insulation of the external insulating portion 102a and 102b can be described in relation to the dielectric constant, or κ value, of said material. The term "elastomer," as used herein, means a material which can be stretched by an external force at room temperature (between 20° C. and 25° C.) to at least twice its original length, and then upon immediate release of the external force, can return to its original length. Elastomers, as used herein, can include a thermoplastic, and may be cross-linked or thermoset.

The conducting portions 104a and 104b can be largely or entirely internal elements of the fluid-impermeable membranes 110a and 110b. The conducting portions 104a and 104b can be conductive to electrical current, such that the conducting portion creates an electric field. In one embodiment, the conducting portions 104a and 104b can be formed between the external insulating portion 102a and 102b and the internal insulating portions 106a and 106b. In another embodiment, the conducting portions 104a and 104b can include hydrogels. The conducting portions 104a and 104b can further include a polymer, an elastomeric polymer (elastomer) or both. Examples of elastomers usable as part of the conducting portions 104a and 104b can include nitrile, EPDM, fluorosilicone (FVMQ), vinylidene fluoride (VDF), hexafluoropropylene (HFP), tetrafluoroethylene (TFE), perfluoromethylvinylether (PMVE), polydimethylsiloxane (PDMS), natural rubber, neoprene, polyurethane, silicone, or combinations thereof. The conducting portions 104a and 104b can further include an electrically conductive dopant, such as silver, gold, platinum, copper, aluminum, or others. In further embodiments, the conducting portions 104a and 104b can include inks and adhesives, for the purpose of flexibility and/or conductivity.

The fluid-impermeable membranes 110a and 110b can be sealed at one or more edges, such that the fluid-impermeable membranes 110a and 110b can form a fluid-impermeable compartment 118. However, in some implementations, the fluid-impermeable membranes 110a and 110b (or portions thereof) may not be separate structures, but instead are a unitary structure. The compartment can hold the dielectric fluid 114. The dielectric fluid 114 can be a fluid that is resistant to electrical breakdown and/or provides insulation. In one or more embodiments, the dielectric fluid 114 can prevent arcing between one or more opposing layers (e.g., the opposing conducting portions 104). The dielectric fluid 114 can be a lipid based fluid, such as a vegetable oil-based dielectric fluid. The dielectric fluid 114 can be ethylene glycol. The dielectric fluid 114 can have an associated dielectric constant, or κ value.

The internal insulating portions 106a and 106b can form an interior surface 112 of the fluid-impermeable membranes 110a and 110b. The internal insulating portions 106a and 106b can be composed of a material similar to that of the external insulating portion 102a and 102b. In one or more embodiments, the internal insulating portions 106a and 106b can include an insulating elastomer, such as nitrile, EPDM, fluorosilicone (FVMQ), vinylidene fluoride (VDF), hexafluoropropylene (HFP), tetrafluoroethylene (TFE), perfluoromethylvinylether (PMVE), polydimethylsiloxane (PDMS), natural rubber, neoprene, polyurethane, silicone, or combinations thereof. In one or more embodiments, the internal insulating portions 106a and 106b can include polymers and elastomers having a high electric breakdown voltage and not electrically conductive. The internal insulating portions 106a and 106b can further include a protective layer 116. The protective layer 116 can be formed between the internal insulating portions 106a and 106b and a dielectric fluid 114, as shown in FIG. 1. In some arrangements, the protective layer 116 can form a part of the interior surface 112. The protective layer 116 can be uniform or varying in size or composition. Further, the protective layer 116 can be non-conductive and/or resistant to corrosion. In one or more embodiments, the protective layer 116 is flexible and corrosion resistant plastic, such as fluorinated ethylene propylene (FEP).

In some instances, the internal insulating portions 106a and 106b can further include a particulate material 117. In FIG. 1B, the particulate material 117 is depicted as being suspended in the dielectric fluid, however this is not intended to be limiting. In some implementations, the particulate material 117 can be embedded in the internal insulating portions 106a and 106b or suspended in the dielectric fluid 114. The particulate material 117 can be uniform or varying in size or composition. Further, the particulate material 117 can be non-conductive. In one embodiment, the particulate material 117 is particulate glass, silicon dioxide or carbide. The particulate material 117 can provide a locking capacity to the actuator 100, such that the actuator 100 does not shift in a lateral direction when the actuator is activated or otherwise in the actuated position. The actuator 100 including the particulate material 117, as described herein, can be referred to as a "locking actuator," in one or more embodiments.

Figure 2A:
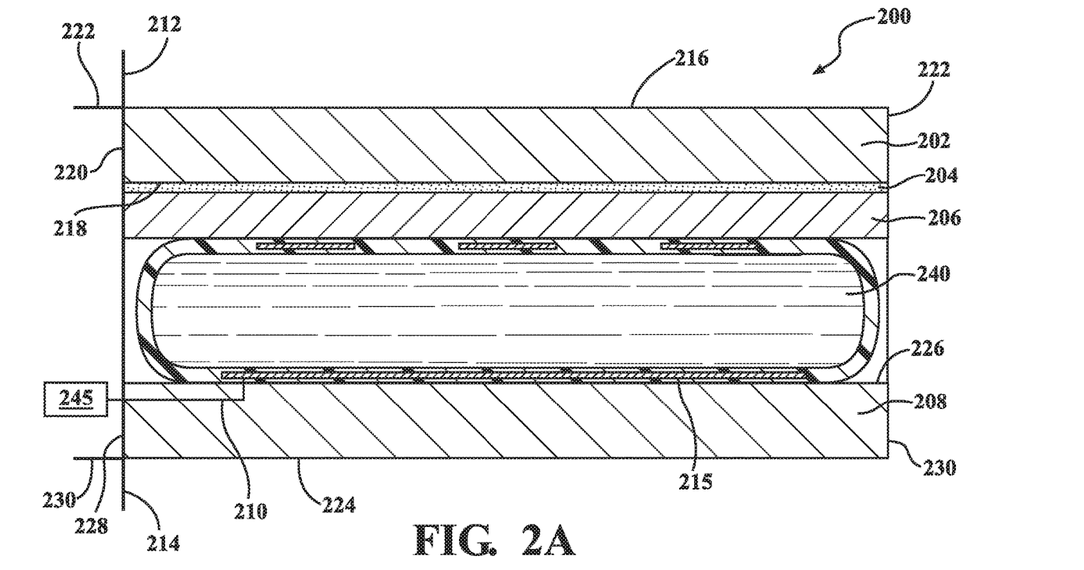
FIGS. 2A and 2B are illustrations of an example of a structure with a variable stiffness portion including one or more actuators, according to one or more embodiments.
Figure 2B:
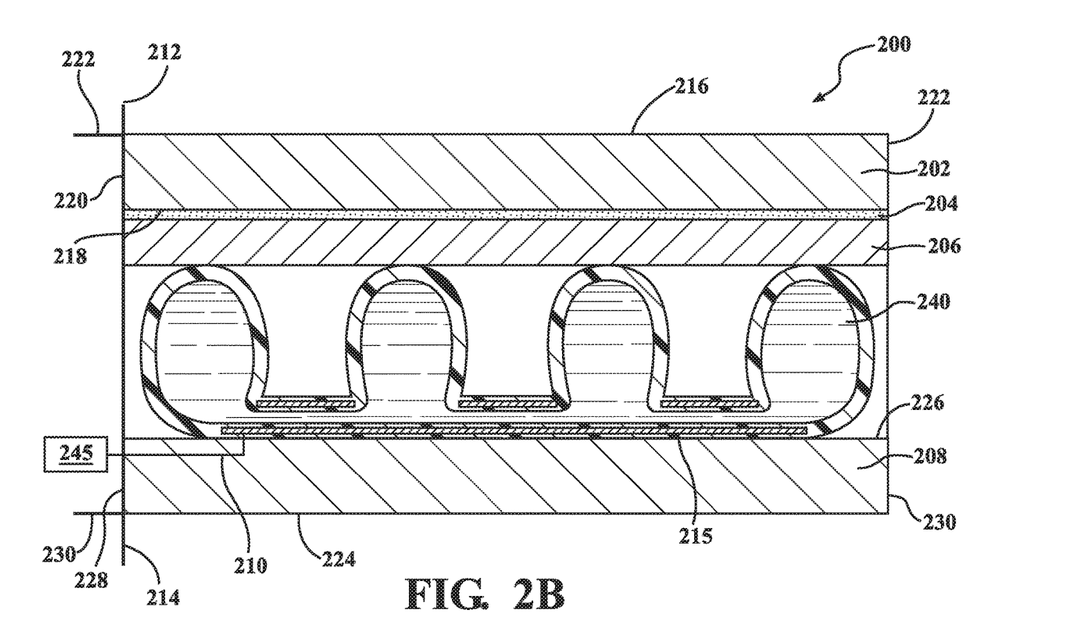

FIGS. 2A and 2B depict a sectional view of a structure 200 with variable stiffness characteristics, according to one of more embodiments. The structure 200 can be configured to be allow the stiffness of a portion of the structure to be controlled upon receiving an input, such as an electrical input. As such, the structure 200 can control the level of stiffness of the structure in response to a secondary force applied to the structure 200. Generally, the structure 200 can include a first plate 202 and a second plate 208 and one or more electrodes 210. The structure 200 can include an adhesive 204, a jamming material 206 and an actuator 240. The actuator 240 can be an actuator. The actuator 240 can be substantially similar in composition and structure to the actuator 100, described with reference to FIG. 1.

FIG. 2A depicts the actuator 240 in a relaxed position, according to one or more embodiments. In one or more embodiments, the structure 200 can include one or more variable stiffness plates, such as the first plate 202 and the second plate 208. The first plate 202 can be in connection with the adhesive 204. In one embodiment, the adhesive 204 can be positioned in connection with an interior surface of the first plate 202. The adhesive 204 can be connected to an actuator 240. The actuator 240 can be positioned in connection with the second plate 208. In one embodiment, the structure 200 can be configured as shown in FIG. 2A. In this embodiment, the first plate 202 and the second plate 208 are shown substantially parallel to each other and forming exterior surfaces of the structure 200. The adhesive 204 and the actuator 240 are depicted here as positioned in between the first plate 202 and the second plate 208.

In one embodiment, the structure 200 can include a first plate 202. The first plate 202 can form an outer boundary of the structure 200. The first plate 202 can have a substantially flat surface. As used herein, the term "substantially" includes exactly the term it modifies and slight variations therefrom. Thus, the term "substantially flat" means exactly flat and slight variations therefrom. In this particular example, slight variations therefrom can include within normal manufacturing tolerances, within about 10 degrees/percent or less, within about 5 degrees/percent or less, within about 4 degrees/percent or less, within about 3 degrees/percent or less, within about 2 degrees/percent or less, or within about 1 degrees/percent or less.

The first plate 202 can have a variety of physical parameters, such that the first plate 202 can be controllably made rigid. The first plate 202 can include rigid materials, semi-rigid materials, flexible materials, or combinations thereof. In one or more embodiments described herein, the first plate 202 can include metals, alloys, polymers, ceramics, or others capable of providing at least some flexibility in response to an applied force. The first plate 202 can further be substantially uniform. In one or more embodiments, the first plate 202 can have a substantially uniform thickness, composition, rigidity, surface roughness, or others. This description of the first plate 202 applies equally to the second plate 208.

The first plate 202 can have a first surface 216, a second surface 218, a retaining edge 220 and an extended edge 222. The first surface 216 can form the exterior facing portion of the first plate 202, with the second surface 218 forming the interior surface. Further, the first surface 216 can have features consistent with being in contact with one or more objects, such as specific surface roughness, material types and others. The first plate 202 can be attached to a support at the retaining edge 220, such as a rigid support 212. The extended edge 222 can then extend cantilevered from the rigid support 212 of the first plate 202. As such, the retaining edge 220 can be the fulcrum of the first plate 202. The retaining edge 220 can be supported or otherwise adapted to maintain integrity or operation of the first plate 202, the second plate 208, and/or the structure 200.

The adhesive 204 can be in connection with the first plate 202. The adhesive 204 can be a single adhesive, or it can be a plurality of adhesives. In one embodiment, the adhesive 204 can be an epoxy or another material having properties allowing the material to be durable and form strong bonds with a variety of other materials. The adhesive 204 can form a solid layer and can be resistant to a variety of external factors. The adhesive 204 can be resistant to a variety of environmental parameters, such as moisture, humidity, and extreme hot or cold temperatures. The adhesive 204 can be an anaerobic adhesive. The adhesive 204 can be resistant to degradation or failure against a plurality of chemicals. These chemicals can include various types of hydraulic fluids, oils, and fuels. The adhesive 204 can adhere between the jamming material 206 and the second surface 218 of first plate 202.

The jamming material 206 can be connected with the adhesive 204. The jamming material 206 can have a variety of physical parameters such that jamming material 206 can provide stability and locking capability to actuator 240 and/or the structure 200. The jamming material 206 can include a variety of rough materials, such as aluminum oxide, silicon oxide, silicon carbide, or others capable of providing a high surface roughness. Further, the jamming material 206 can be a coated abrasive material. In one example, the jamming material 206 can include sheets of paper or cloth with abrasive material adhered to one face. The jamming material 206 can be a coated abrasive such as aluminum oxide paper or silicon carbide paper of varying grit sizes (lower numbers such as 20 or 40 indicating a coarse grit, while a larger number such as 1500 indicates a fine grit). In further embodiments, the jamming material 206 can be a ceramic aluminum oxide which can be used in high pressure applications. In further embodiments, the jamming material 206 can be sand. The jamming material 206 can be positioned so as to create friction between the actuator 240 and the first plate 202, such as with the jamming material 206 facing the actuator 240.

The actuator 240 can be positioned in connection with the jamming material 206. The actuator 240 can be substantially similar to actuator 100 described in reference to FIG. 1. The actuator 240 can be configured to receive an input, such as an electrical input, the input can be delivered through the electrodes 210. The electrodes 210 can be connected to or connected with one or more conducting portions 215 of the actuator 240. The electrodes 210 can be positioned in a plurality of locations. In one or more embodiments, the electrodes 210 can connect to the actuator 240 at a second surface 226 of the second plate 208. In one or more further implementations, the actuator 240 can further include a protective coating. The protective coating can be positioned on the exterior or interior surfaces of the actuator 240. The protective coating can be substantially similar to the protective layer 116, described above with reference to FIG. 1. The protective coating can be configured to reduce abrasion of the actuator 240 or otherwise provide resistance to wear against the jamming material 206.

The actuator 240 is depicted here in FIG. 2A in a relaxed position. The actuator 240 moves into an actuated position (FIG. 2B) as electrical input is applied through electrodes 210. In one or more embodiments, the actuator 240 can include a plurality of conductive portions configured to create hydraulic force preferentially toward the jamming material 206. In further embodiments, the structure 200 can be configured to include a plurality of the actuators 240. The actuators 240 can be configured to control one or more regions of the structure in an independent fashion.

As depicted here, the second plate 208 can be substantially parallel to the first plate 202. The second plate 208 can have a first surface 224, a second surface 226, a retaining edge 228, and an extended edge 230. The first surface 224 can form an exterior facing portion of the second plate 208, with the second surface 226 forming an interior surface. Further, the first surface 224 can have features consistent with being in contact with one or more objects, such as designated surface area roughness, material types and others. The second plate 208 can be attached to a support at the retaining edge 228, such as rigid support 214. The extended edge 230 can then extend cantilevered from the rigid support 212. The first plate 202 and the second plate 208 can be connected to rigid supports 212 and 214 respectively. The rigid supports 212 and 214 can thus provide stability to the first plate 202 and the second plate 208.

The rigid supports 212 and 214 can be an element to secure and support the components of the structure 200. The rigid supports 212 and 214 can be configured to provide stability for structure 200. The rigid supports 212 and 214 can be composed of varying materials capable of providing resistance and support to the first plate 202 and the second plate 208 in operation. In one or more embodiments, the rigid supports 212 and 214 can be metals, alloys, polymers, ceramics, or others capable of providing rigid stability in response to an applied force. The rigid supports 212 and 214 can further be substantially uniform in one or more physical characteristics, such as having a uniform thickness, composition, rigidity, surface roughness, or others. The rigid supports 212, 214 can be separate structures. Alternatively, the rigid supports 212, 214 can be the same structure.

The actuator 240 can be connected to a control unit 245. The control unit 245 can be configured to deliver an input, such as an electrical input. The electrical input can be applied to conductive portions 215 through electrodes 210. In one or more embodiments, the control unit 245 can be a communication device for receiving signals from a computing device. In further embodiments, the control unit 245 can be a computing device. Computing devices, as used herein, are described in greater detail, with reference to FIG. 4. When conductive portions 215 of the actuator 240 receive the input, conductive portions 215 can attract to one another, moving the actuator 240 to the actuated position and applying hydraulic force to jamming material 206. Application of force to jamming material 206 can further apply force to first plate 202 and the second plate 208, resulting in the structure 200 becoming rigid. Through control of the actuation of the actuator 240, the structure 200 can then control the level of force applied. The connection of the first plate 202 and the second plate 208 to the rigid supports 212 and 214 create a fulcrum from which the structure 200 can bend.

Though the actuator 240 is depicted as extending out from the rigid supports 212 and 214, this is not intended to be limiting of possible positions and/or orientations of the actuator 240 relative to the first and second plates 202 and 208. In one or more implementations, the actuator 240 can be positioned in a length-wise direction, a width-wise direction, or any position in between on the first and second plates 202 and 208. Further, though shown here as a single actuator 240, the actuator 240 can be one of a plurality of actuators 240 positioned or stacked in any organization or permutation.

As an example, in one implementation, there can be a plurality of actuators 240 that extend width-wise in the first and second plates 202 and 208. The plurality of actuators 240 can be distributed in any suitable manner along the length of the first and second plates 202 and 208, including at regular or irregular intervals. Further, though shown as having a plurality of conductive portions 215, and variety of organization of conductive portions 215 can be used in one or more implementations described herein. One skilled in the art will understand the variety of combinations disclosed herein without further explicit recitation.

FIG. 2B depicts the structure 200 with applied electrical input from the control unit 245, according to one embodiment. The control unit 245 can be connected to structure 200 in various locations, as described above with reference to FIG. 2A. In one or more embodiments, the control unit 245 can be configured to deliver an input, such as electrical input, to the conducting portions. In one or more embodiments, the control unit 245 can be a communication device for receiving signals from a computing device. In further embodiments, the control unit 245 can be a computing device.

In operation, a force can be applied to the structure 200 between the retaining edge (e.g., retaining edges 220 and 228) and the extending edge (e.g., extended edges 222 and 230) of the first and second plates 202 and 208. The force can be a variety of available forces, such as from the weight of an applied object. This force can cause a distortion or bend in the structure 200. The bend can be in reference to a movement of the extending edge from the first position to a second position, where the retaining edge remains in substantially the same position.

The control unit 245 can provide one or more inputs to the structure 200 to change the stiffness of the structure 200. In one embodiment, the control unit 245 provides an electrical input. The electrical input can be applied to conductive portions 215 of the actuator 240 through the electrode 210. In one or more embodiments, the actuator 240 can be configured to create hydraulic force using the electrical input from a control unit 245. The electrode 210 can be positioned in connection with the conductive portions 215, such as through a second surface 226 and connected to the membrane of the actuator 240 at one or more conductive portions 215. The electrode 210 can connect between the actuator 240 and the second surface 226. In response to the electric input, the conductive portions 215 can then create an electric field which causes them to draw together. Thus causing the actuator 240 to move into the actuated position.

The contraction of the conductive portions 215 forces the dielectric fluid into other regions of the actuator 240 creating a hydraulic force. Upon activation, the hydraulic force can then be applied to the jamming material 206 and first plate 202, forcing the jamming material 206 into contact with both the actuator 240 and the first plate 202. The expansion of the actuator 240 against the first plate 202 and the second plate 208 can cause the structure 200 to become more rigid. Further, the hydraulic force can cause the first plate 202 and the second plate 208 to straighten. Thus, the application of hydraulic force by actuator 240 can result in the structure 200 becoming controllably rigid.

Figure 3A:
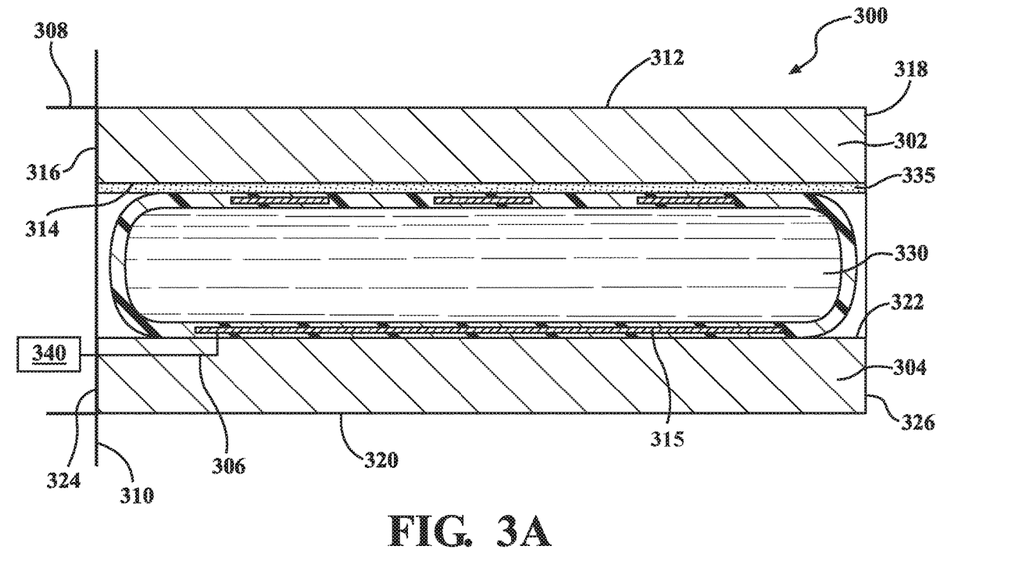
FIGS. 3A and 3B are illustrations of an example of a structure with a variable stiffness portion including one or more locking actuators, according to one of more embodiments.
Figure 3B:
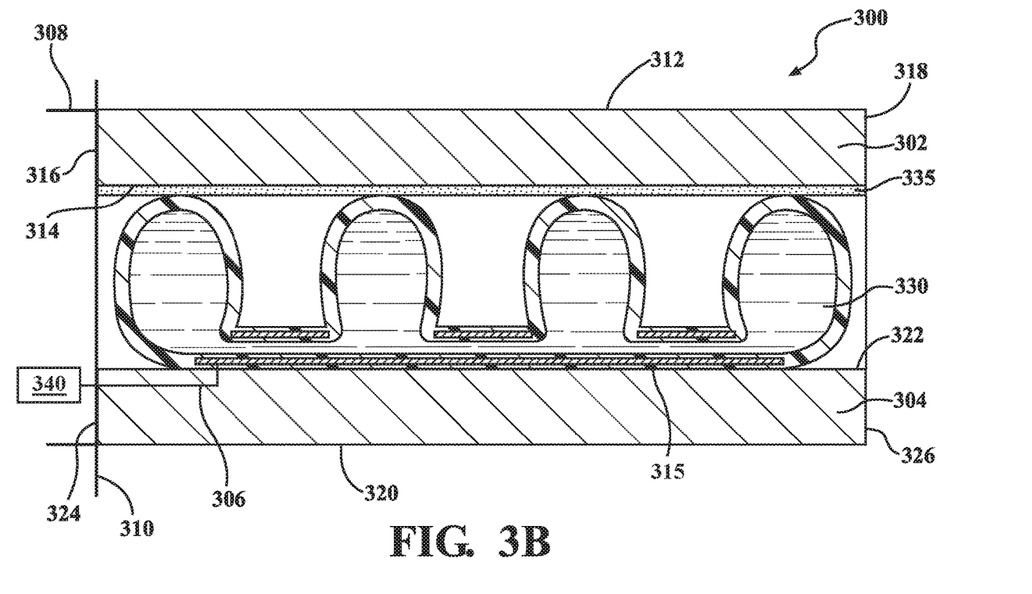

FIGS. 3A and 3B depict a structure 300 with an actuator 330 in an actuated position, according to one or more embodiments. The structure 300 can be substantially similar in composition to structure 200 as depicted in FIGS. 2A and 2B. The structure 300 can include a first plate 302 and a second plate 304. The actuator 330 can be positioned in between the first plate 302 and the second plate 304. In one or more embodiments, the actuator 330 can be a locking hydraulic actuator. The structure 300 can be configured to be controllably rigid upon receiving an input, such as an electrical input. As such, the structure 300 can control the level of force applied in response to a secondary force.

FIG. 3A depicts a structure 300, according to one or more embodiments. The structure 300 can be configured to be controllably rigid upon receiving an input, such as an electrical input as delivered by a control unit 340. In one or more embodiments, the control unit 340 can be a communication device for receiving signals from a computing device. In further embodiments, the control unit 340 can be a computing device. The control unit 340 or elements thereof can be substantially similar to the control unit 245, described with reference to FIG. 2A. As such, the structure 300 can control the level of force applied in response to a secondary force.

Generally, the structure 300 can include a first plate 302. The first plate 302 can have a first surface 312, a second surface 314, a retaining edge 316 and an extended edge 318. The first surface 312 can form the exterior facing portion of the first plate 302, with the second surface 314 forming the interior surface. The first plate 302 can be attached to a support at the retaining edge 316, such as a rigid support 308. The extended edge 318 can then extend out from the rigid support 308 of the first plate 302. As such, the retaining edge 316 can be the fulcrum of the first plate 302. The first plate 302 can be substantially similar to the first plate 202, as descried in FIG. 2A.

The structure 300 can include a second plate 304. As depicted here, the second plate 304 can be positioned parallel to the first plate 302. The second plate 304 can have a first surface 320, a second surface 322, a retaining edge 324, and an extended edge 326. The second plate 304 can be substantially similar to the second plate 208, described with reference to FIGS. 2A and 2B. The first surface 320 can form the exterior facing portion of the second plate 304, with the second surface 322 forming the interior surface. The second plate 304 can be attached to a support at the retaining edge 324, such as rigid support 310. The extended edge 326 can then extend out from the second plate 304. The first plate 302 and the second plate 304 can be connected to rigid supports 308 and 310 respectively.

The rigid supports 308 and 310 can be an element to secure and support the components of the structure 300. The rigid supports 308 and 310 can be configured to provide stability for structure 300. The rigid supports 308 and 310 can be substantially similar to the rigid supports 212 and 214, described with reference to FIGS. 2A and 2B.

The structure 300 can include an actuator 330. The actuator 330 can be similar in composition to and/or include one or more elements of the actuator 100 above including the particulate material 117, as described with reference to FIG. 1. The actuator 330 can be configured to receive an input, such as an electrical input. The input can be delivered to the actuator 330 through one or more electrodes 306. The electrodes 306 can be substantially similar to the electrodes 210, described with reference to FIGS. 2A and 2B. The electrodes 306 can be connected to or connected with one or more conducting portions 315 of the actuator 330. The actuator 330 is depicted here in a relaxed position. The actuator 330 moves into an actuated position as electrical input is applied through electrodes 306.

An adhesive 335 can be in connection with the first plate 302. The adhesive 335 can be substantially similar to the adhesive 204, described with reference to FIGS. 2A and 2B. In one or more embodiments, the adhesive 335 can adhere between the one or more portions of the exterior surface of the actuator 330 and the second surface 314 of first plate 302. In further embodiments, the adhesive 335 can adhere between the one or more portions of the exterior surface of the actuator 330 and the second surface 322 of second plate 304. The actuator 330 can be positioned in connection with the first plate 302. The actuator 330 can be substantially similar to actuator 100 including the particulate material 117, described with reference to FIG. 1. In one or more further implementations, the actuator 330 can further include a protective coating. The protective coating can be positioned on the exterior or interior surfaces of the actuator 330. The protective coating can be substantially similar to the protective layer 116, described above with reference to FIG. 1. The protective coating can be configured to reduce abrasion of the actuator 330 or otherwise provide resistance to wear, as can occur from one or more surfaces of the structure 300.

The actuator 330 can be configured to receive an input, such as an electrical input through electrodes 306. The electrodes 306 can connect to one or more conducting portions 315 of the actuator 330. Shown here, the actuator 330 is depicted in a relaxed position. The actuator 330 can be configured to move into the actuated position as electrical input is applied through electrodes 306 to the conducting portions 315. In the actuated position, the actuator 330 can apply a hydraulic force to the first plate 302 and a second plate 304. As the actuator 330 can resist lateral movement while applying force to both the first plate 302 and a second plate 304, the rigidity of the structure 300 can be increased.

FIG. 3B depicts the structure 300 with applied electrical input from the control unit 340, according to one embodiment. The structure 300 can be substantially similar to structure 300, as described above with reference to FIG. 3A. The control unit 340 can be connected to structure 300 in various locations. The control unit 340 can be configured to deliver an input, such as electrical input, to structure 300 through electrode 306. In one or more embodiments, the control unit 340 can be a communication device for receiving signals from a computing device. In further embodiments, the control unit 340 can be a computing device. The control unit 340 or elements thereof can be substantially similar to the control unit 245, described with reference to FIG. 2A. In this embodiment, the electrode 306 can be positioned similarly to the electrode 306 as described in FIG. 3A. The electrode 306 can be positioned on second surface 322. The electrode 306 can connect the actuator 330 to the second surface 322 of the second plate 304. The electrode 306 can connect to one or more conducting portions 315 of the actuator 330. As an electric charge is delivered from the electrode 306 to the conductive portion 315, the actuator 330 moves to the actuated position. The actuator 330 can then create a hydraulic force which can be applied to first plate 302. Application of the hydraulic force by the actuator 330 can result in the structure 300 becoming controllably rigid. The actuator 330 can remain "locked" in place until the input is terminated or another input is received, such as the electrical input from the control unit 340 being terminated.

As described in the embodiments herein, the structures can provide selectively variable stiffness to an applied force. Thus, the structures 300 can provide numerous benefits. The structures 300 can act as a structural or frame support for flexible applications, such as in robotics, automotive, or architecture. Further, the structures 300 can provide variable resistance, such as when accommodating for high winds of changing velocity or aerodynamics. The layers above are described as a single, uniform element for simplicity purposes. However, the above can include one or more of any of the layers, portions of layers, or variations as disclosed herein.

Figure 4:
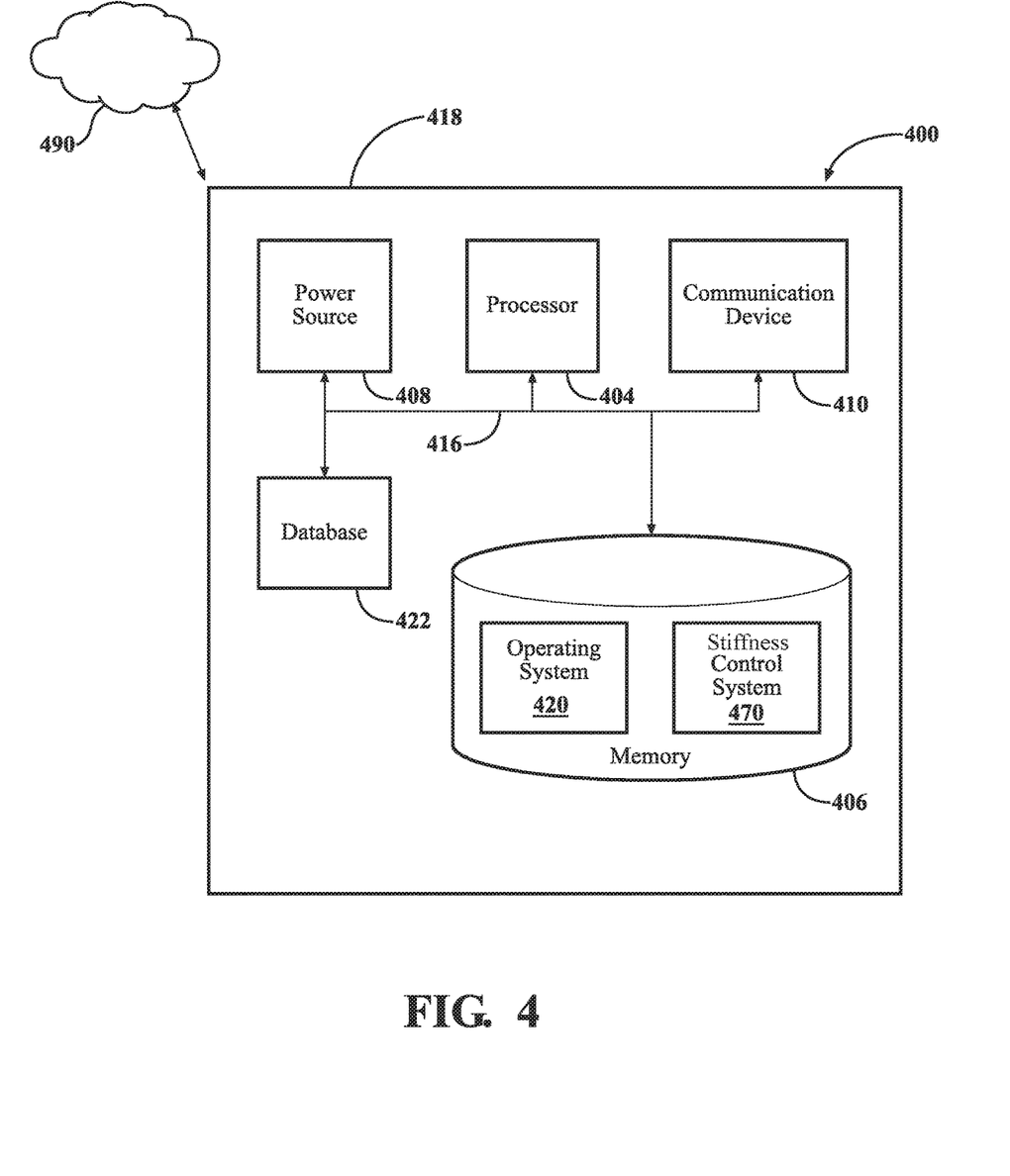
FIG. 4 is a computing device adaptable for use with one or more embodiments described herein.

FIG. 4 is a block diagram of the computing device 400 usable with the structure described above, according to one or more embodiments. The computing device 400 can be any appropriate type of computing device such as, but not limited to, a server, a personal computer (PC), workstation, embedded computer, or stand-alone device with a computational unit, such as a microprocessor, DSP (digital signal processor), FPGA (field programmable gate array), or ASIC (application specific integrated circuit), or others. The computing device 400 can contain various components for performing the functions that are assigned to said computing device. The components can include a processor 404, like a central processing unit (CPU), a memory 406, a power source 408, communications device 410, input and/or output devices, and at least one bus 416 that connects the aforementioned components. In some embodiments, one or more of these components are at least partially housed within a housing 418.

The processor 404, which can also be referred to as a CPU, can be a device which is capable of receiving and executing one or more instructions to perform a task as part of a computing device. In one embodiment, the processor 404 can include a microprocessor such as an application specific instruction set processor (ASIP), graphics processing unit (GPU), a physics processing unit (PPU), a DSP, an image processor, a co-processor, or others. Though referenced as the processor 404, it is understood that one or more processors 404 can be used in one or more embodiments described herein, including combinations of processors 404.

The memory 406 is any hardware that is capable of storing data or information. Examples of data or information which can be stored in the memory 406 include, without limitation, data, program code in functional form, and/or other suitable information either on a temporary basis and/or a permanent basis. The memory 406 can include one or more modules that include computer-readable instructions that, when executed by the processor 404, cause the processor 404 to perform methods and functions that are discussed herein. The memory 406 can include volatile and/or nonvolatile memory. The memory 406 can further include a computer-readable storage medium. Examples of suitable memory 406 include RAM (Random Access Memory), flash memory, ROM (Read-Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof.

The memory 406 can be a component of the processor(s) 404, or the memory 406 can be operably connected to the processor(s) 404 for use thereby. The memory 406 can include an operating system 420, such as LINUX. The operating system 420 can include batch, live, time sharing, real time, and other types of operating systems. The operating system 420, as described herein, can include instructions for processing, accessing, writing, storing, searching data, or other functions as selected by the user for controlling and providing an interface with the computing device 400. The memory 406 can include communications procedures for communicating with the network 490, and/or another computing device.

The communication device 410 can be wired or wireless connection components and/or software allowing the computing device 400 to communicate with other computing devices. The communication device 410 can allow communication with devices either locally or remotely, such as over a network protocol (e.g., Ethernet or similar protocols). In one example, the computing device 400 is connected to the network 490 using the communication device 410. The communication device 410 can further be connected with remote devices associated with other computing devices. In further embodiments, the computing device 400 can connect with one or more computing devices, allowing access to one or more sensors, which are connected to or in connection with the second computing device.

The computing device 400 can further include a stiffness control system 470 or components thereof. As described herein, certain components of the stiffness control system 470 can be stored in the computing device 400 or combinations thereof. As such, one or more embodiments of the stiffness control system 470 can include the stiffness control system 470, modules thereof, or components thereof as being stored, collected, created, compared or otherwise made available from the memory 406 or the database 422 of the computing device 400. When stored as part of the computing device 400, the stiffness control system 470 can access another computing device 400, or other devices through the communications device 410 and the network 490, allowing for continuity between the one or more components which comprise the stiffness control system 470.

Figure 5:
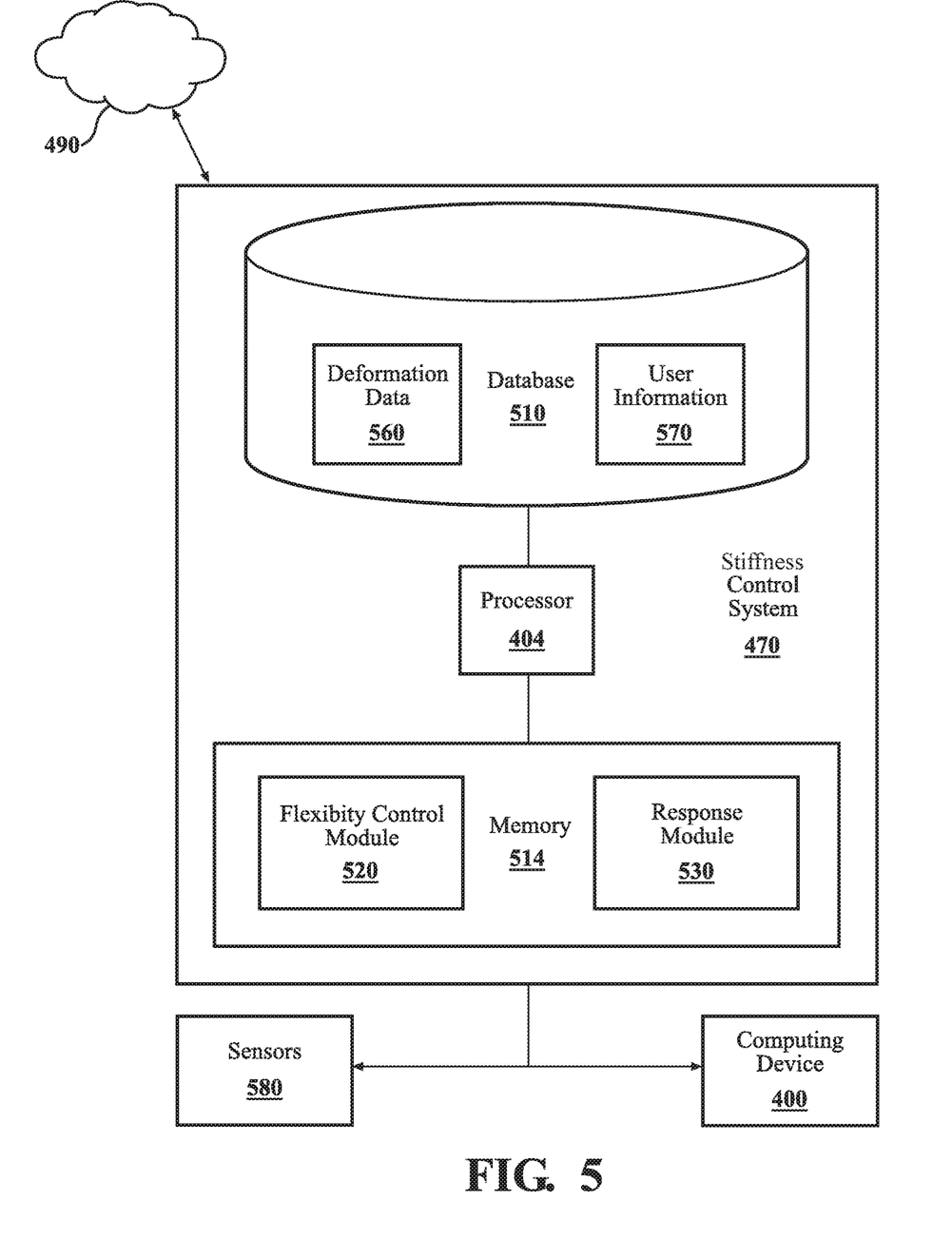
FIG. 5 is a stiffness control system for the stiffness control, according to one or more embodiments.

The discussion of the stiffness control system 470 begins at FIG. 5, with an illustration of the stiffness control system 470, according to one embodiment. The stiffness control system 470 is shown as including the processor 404 from the computing device 400, depicted in FIG. 4. Accordingly, the processor 404 can be a part of the stiffness control system 470, the stiffness control system 470 can include a separate processor from the processor 404 or the stiffness control system 470 can access the processor 404 through a data bus or another communication path. In one embodiment, the stiffness control system 470 includes the memory 514 that can store a flexibility control module 520, and a response module 530. The memory 514 can be a RAM, ROM, a hard disk drive, a flash memory, or other suitable memory for storing the modules 520 and 530. The modules 520 and 530 are, for example, computer-readable instructions that when executed by the processor 404, cause the processor 404 to perform the various functions disclosed herein.

The stiffness control system 470 can further include a database 510. The database 510 can be presented in a number of configurations, including as part of the memory 514, as an independent component from the memory 514, as part of a separate memory (distinct from memory 514), or others. The database 510 can include deformation data 560 and user information 570. The deformation data 560 can include data sets as detected or determined about the structure and/or each of the actuators regarding maximum deformation, current deformation, useful life and other details which can be used to control the structure during use. The user information 570 can include information related to selections for and uses of the structure by a user. The stiffness control system 470 or portions thereof, can be stored as part of the computing device 400, as part of a server, or others. As such, one or more of the functions of the stiffness control system 470 or of the modules contained therein, can be performed remotely and transferred to structure as part of the embodiments described herein.

The flexibility control module 520 can generally include instructions that when executed by the processor 404, control the processor 404 to receive input regarding a response parameter for the structure. The response parameter is one or more control limitations which relate to input from the user or the environment that the structure is in use. In one or more embodiments, the response parameter can include an upper and lower boundary for deflection of the structure. The input is a signal that a user or an object either intends to or is in the process of interacting with the structure. As such, inputs can include sensor signals received from one or more sensors with relation to the structure, such as signals from cameras, gyroscopes, accelerometers, and others which indicate motion or interaction with the structure. Inputs can further include selections or instructions from a user, such as instructions which indicate a hardness desired or which indicate that the surface will be receiving a force from an object. The structure, as used herein, can be substantially similar to the structure 200 and 300 described with reference to FIGS. 2-3.

The structure can deform by one or more forces changing the shape of the actuators. Deformation, as used herein, refers to the change from an original or unstressed state of the structure as a whole or the un-locking of one or more of the actuators. As described above, the structure can change rigidity due to force from one or more objects against the structure. The flexibility control module 520 can detect the deformation of the structure by a number of mechanisms, such as external sensors, detection of capacitance of the membrane, or others. The flexibility control module 520 can further detect differences in deformation between the actuators, such that each of the actuators is analyzed individually. In further embodiments, the deformation of the structure can be analyzed in groups or as a whole, based on the desires of the user. The deformation levels can then be stored by the flexibility control module 520 in the deformation data 560 of the database 510.

The response parameter can be one or more limitations related to the inputs that define when the stiffness control system 470 will respond. With relation to inputs directly from the user, the flexibility control module 520 can be configured to respond to any inputs as given, to specific users, to specific commands, or others as desired. With relation to inputs from sensors or sensor systems, the flexibility control module 520 can be configured to respond to any inputs, inputs within specific parameters, inputs received from combinations of sensors, inputs above or below a certain threshold or others. In one example, the flexibility control module 520 can be configured to respond to a motion as detected by a camera or an accelerometer or combinations thereof. In another example, the flexibility control module 520 can be configured to respond to vibrations or weight above a certain threshold. In another embodiment, the flexibility control module 520 can be configured to respond to change in capacitance at the actuator of the structure, such as seen in stretching.

The flexibility control module 520 can further include instructions to send an activation signal with relation to the response parameter. The activation signal can be an input determined by the flexibility control module 520 to create an appropriate response in the structure, such as changes in rigidity to affect either location or specific general hardness. The activation signal can be delivered to the structure, as described above with reference to FIGS. 2-3. The activation signal can be received directly by the flexibility control module 520 or through a network, such as a network 490. The activation signal can further include individualized input or group input regarding one or more switches that are in connection with the structure. In another embodiment, the activation signal is a signal delivered by the control unit to the one or more conductive regions of the actuator, according to embodiments described herein. The individualized input can be stored as part of the user information 570 in the database 510.

The flexibility control module 520 can further include instructions to release (e.g., unlock) one or more of the actuators of the structure. The actuators can be maintained in a locked state or an unlocked state, according to one or more embodiments described herein. When maintained in the locked state, the actuators can be released by reducing or removing the electric current at one or more of said actuators. The conductive portion will then separate due to the removal of charge, and the actuators will then become pliable. Once the membrane is pliable, the structure is then responsive to one or more external forces (e.g., change in fluid pressure due to elasticity) which can cause the structure to be in a relaxed state.

The response module 530 can generally include instructions that function to control the processor 404 to activate the actuators at a desired deformation level. Once the structure has reached a desired state or a state limited by one or more secondary factors (e.g., maximum weight capacity), the response module 530 can activate one or more of the actuators to assign said force to the structure. Once the actuators are activated again, the elasticity of the actuators will again be limited. In this way, the structure can hold a specific rigidity as desired or based on one or more parameters set by the stiffness control system 470.

Thus the stiffness control system 470 and the structure can regulate the movement of the structure. The structure can change from a relaxed state to a contracted state, and each state can be held by the actuators, such that the rigidity of the structure to external forces can be variably maintained. The structure can provide numerous benefits. The structure can provide structural rigidity to a variety of devices based on need, thus using energy input to reduce weight. The stiffness control system 470 can add a level of modulation to the structure, allowing the structure to be intelligently controlled.

Other and further embodiments of the systems and methods described above are contemplated, including combinations of or deletions from said systems and methods, without specific recitation thereof. Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible embodiments of systems, methods and computer program products according to various embodiments. In this regard, each block in the flowcharts or block diagrams can represent a module, segment, or portion of code, which can include one or more executable instructions for implementing the specified logical function(s). It should also be noted that, in some alternative embodiments, the functions noted in the block can occur out of the order noted in the figures. For example, two blocks shown in succession can, in fact, be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which can include all the features enabling the embodiment of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by or in connection with an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

While the foregoing is directed to embodiments of the disclosed devices, systems, and methods, other and further embodiments of the disclosed devices, systems, and methods can be devised without departing from the basic scope thereof. The scope thereof is determined by the claims that follow.

What is claimed is:

1. A structure with variable stiffness comprising:
   a first plate having a variable stiffness region, the first plate attached to a support;
   a second plate having a variable stiffness region, the second plate positioned opposite the first plate and attached to the support, the first plate and the second plate defining a compartment;
   a jamming material attached to an inner surface of the first plate; and
   one or more actuators located within the compartment, the one or more actuators do not define an outer surface of the structure, each of the one or more actuators including:
     a fluid-impermeable membrane defining a chamber, the chamber consisting essentially of a dielectric fluid; and
     a first conductive portion and a second conductive portion operatively positioned on opposite portions of the fluid-impermeable membrane,
   each of the one or more actuators being configured such that, when an electrical input is supplied to the first conductive portion and the second conductive portion, the first conductive portion and the second conductive portion become electrostatically attracted toward each other, causing at least a portion of the dielectric fluid to be displaced to other portions of the chamber such that the fluid-impermeable membrane applies a force against the jamming material and the second plate and such that an overall shape of the structure does not change.

2. The structure of claim 1, wherein the electrical input is provided by a control unit.

3. The structure of claim 2, wherein the control unit is a computing device connected to supply the electrical input to the first conductive portion and the second conductive portion.

4. The structure of claim 1, wherein the jamming material is attached to the inner surface of the first plate using an adhesive.

5. The structure of claim 1, wherein at least one of the first conductive portion and the second conductive portion includes a plurality of conductive portions.

6. The structure of claim 1, wherein the first plate or the second plate comprise a flexible alloy material.

7. The structure of claim 1, wherein the one or more actuators is a plurality of actuators.

8. A structure with variable stiffness comprising:
   a first plate having a variable stiffness region, the first plate attached to a support;
   a second plate having a variable stiffness region, the second plate positioned opposite the first plate and attached to the support; and
   one or more actuators in contact with an inner surface of the second plate, the one or more actuators being configured resist deformation in response to receiving an electrical input, the one or more actuators do not define an outer surface of the structure, each of the one or more actuators including:
     a fluid-impermeable membrane defining a chamber, the chamber consisting essentially of a dielectric fluid; and
     a first conductive portion and a second conductive portion operatively positioned on opposite portions of the fluid-impermeable membrane,
   each of the one or more actuators being configured such that, when an electrical input is supplied to the first conductive portion and the second conductive portion, the first conductive portion and the second conductive portion become electrostatically attracted toward each other, causing at least a portion of the dielectric fluid to be displaced to other portions of the chamber such that the fluid-impermeable membrane applies a force against the first plate and the second plate and such that an overall shape of the structure does not change.

9. The structure of claim 8, wherein the electrical input is provided by a control unit, and wherein the control unit is a computing device connected to supply the electrical input to the first conductive portion and the second conductive portion.

10. The structure of claim 8, wherein the one or more actuators are adhered to the first plate and the second plate using an adhesive.

11. The structure of claim 8, wherein the one or more actuators include a plurality of conductive portions.

12. The structure of claim 8, wherein the first plate or the second plate comprise a flexible alloy material.

13. The structure of claim 8, wherein the one or more actuators is a plurality of actuators.

14. A stiffness control system comprising:
   a structure having one or more actuators and configured to harden in response to an electrical current, the one or more actuators do not define an outer surface of the structure, each of the one or more actuators including:

a fluid-impermeable membrane defining a chamber, the chamber consisting essentially of a dielectric fluid; and a first conductive portion and a second conductive portion operatively positioned on opposite portions of the fluid-impermeable membrane, each of the one or more actuators being configured such that, when an electrical input is supplied to the first conductive portion and the second conductive portion, the first conductive portion and the second conductive portion become electrostatically attracted toward each other, causing at least a portion of the dielectric fluid to be displaced to other portions of the chamber such that the fluid-impermeable membrane applies a force against an inner surface of the structure and such that an overall shape of the structure does not change; and a stiffness control system for controlling the structure, comprising:

one or more processors; and a memory communicably coupled to the one or more processors and storing:

a flexibility control module including instructions that when executed by the one or more processors cause the one or more processors to receive input regarding a response parameter for the structure, and to send an activation signal with relation to the response parameter; and a response module including instructions that when executed by the one or more processors cause the one or more processors to deliver an electrical current to the one or more actuators in response to the activation signal.

15. The stiffness control system of claim 14, wherein the structure further comprises:

a first plate attached to a support; and a second plate positioned opposite to first plate and attached to the support, wherein the one or more actuators are positioned between and attached to the first plate and the second plate.

16. The stiffness control system of claim 14, wherein the structure further comprises:

a first plate having a variable stiffness region, the first plate attached to a support;

a second plate having a variable stiffness region, the second plate positioned opposite the first plate and attached to the support; and a jamming material attached to an inner surface of the first plate, the one or more actuators being connected with an inner surface of the second plate and the jamming material.

17. The stiffness control system of claim 14, wherein the input is detected movement derived from one or more sensors.

18. The stiffness control system of claim 14, wherein the response parameter comprises an upper and lower boundary for deflection of the structure.

19. The stiffness control system of claim 14, wherein the one or more actuators is a plurality of actuators.

20. The stiffness control system of claim 19, wherein the response module is configured to control the plurality of actuators individually.

* * * * *